(12) United States Patent
Peiffer et al.

(10) Patent No.: US 6,703,119 B2
(45) Date of Patent: *Mar. 9, 2004

(54) BIAXIALLY ORIENTED POLYESTER FILM HAVING A HIGH OXYGEN BARRIER AND PROCESS FOR ITS PRODUCTION

(75) Inventors: Herbert Peiffer, Mainz (DE); Gottfried Hilkert, Saulheim (DE); Richard Lee Davis, Wiesbaden (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 48 days.

This patent is subject to a terminal disclaimer.

(21) Appl. No.: 09/922,674

(22) Filed: Aug. 6, 2001

(65) Prior Publication Data

US 2002/0039646 A1 Apr. 4, 2002

(30) Foreign Application Priority Data

Aug. 11, 2000 (DE) .......................... 100 39 367

(51) Int. Cl.$^7$ .................. B32B 27/06; B32B 15/08; B29C 55/12
(52) U.S. Cl. .................. 428/332; 428/458; 428/480; 264/173.16; 264/173.17; 264/210.7; 427/457
(58) Field of Search ................. 428/458, 215, 428/220, 910, 480, 332; 264/173.16, 173.17, 210.7; 427/457

(56) References Cited

U.S. PATENT DOCUMENTS

| | | |
|---|---|---|
| 5,795,528 A | 8/1998 | Klein et al. |
| 6,149,995 A * | 11/2000 | Peiffer et al. ............... 428/35.8 |
| 6,391,410 B1 * | 5/2002 | Peiffer et al. ............... 428/35.7 |
| 2002/0037418 A1 * | 3/2002 | Peiffer et al. ............... 428/458 |
| 2002/0090498 A1 * | 7/2002 | Peiffer et al. ............... 428/216 |

FOREIGN PATENT DOCUMENTS

| | | |
|---|---|---|
| EP | 0 849 075 A2 | 6/1998 |
| EP | 878297 A2 * | 11/1998 |
| EP | 0 878 298 A2 | 11/1998 |
| EP | 945256 A2 * | 9/1999 |
| EP | 945259 A2 * | 9/1999 |
| EP | 945261 A2 * | 9/1999 |
| EP | 0 945 262 A2 | 9/1999 |
| EP | 945263 A2 * | 9/1999 |

* cited by examiner

*Primary Examiner*—Monique R. Jackson
(74) *Attorney, Agent, or Firm*—ProPat, L.L.C.

(57) ABSTRACT

A metalized or ceramic-coated biaxially oriented polyester film is disclosed, with a base layer B which comprises at least 80% by weight of thermoplastic polyester, and with at least one outer layer A. The outer layer A is composed of a copolymer or of a mixture of polymers/copolymers which contains from 90 to 98% by weight of ethylene 2,6-naphthalate units and up to 10% by weight of ethylene terephthalate units, and/or units derived from cycloaliphatic or aromatic diols and/or dicarboxylic acids. The thickness of the outer layer A is more than 0.7 μm and this makes up less than 25% by weight relative to the entire film. The $T_g2$ value of the polyester film is above the $T_g2$ value of the base layer, but below the $T_g2$ value of the outer layer. The film has low permeability to atmospheric oxygen and exhibits very good adhesion between the individual layers. It is particularly suitable for packaging purposes, specifically for packaging foods or other consumable items.

13 Claims, No Drawings

---

BIAXIALLY ORIENTED POLYESTER FILM HAVING A HIGH OXYGEN BARRIER AND PROCESS FOR ITS PRODUCTION

BACKGROUND OF THE INVENTION

The invention relates to a transparent, biaxially oriented polyester film with a base layer B which comprises at least 80% by weight of thermoplastic polyester, and with at least one outer layer A and with a metallic or ceramic layer arranged on the outer layer A. The invention further relates to the use of the film and to a process for its production.

Prior art

EP-A-0 878 298 describes a biaxially oriented polyester film with a base layer B, at least 80% by weight of which is composed of a thermoplastic polyester, and with an outer layer A and with a metallic or ceramic layer arranged on the outer layer A. The outer layer A of this film is composed of a mixture of polymers which contains at least 60% by weight of ethylene 2,6-naphthalate units (PEN), up to 40% by weight of ethylene terephthalate units (PET) and optionally up to 10% of units derived from cycloaliphatic or aromatic diols and/or dicarboxylic acids.

If the metallized or ceramic-coated outer layer A of the film of EP-A-0 878 298 contains high concentrations of ethylene 2,6-naphthalate units, the film has a tendency for delamination between the outer layer A and the base layer B. If, on the other hand, the outer layer A contains low concentrations of ethylene 2,6-naphthalate units, the thickness of this layer has to be raised in order to achieve the desired low oxygen permeation of not more than 0.3 cm$^3$/(m$^2$·bar·d).

In a film in Example 8 of EP-A-0 878 298 the metallized outer layer A uses pure polyethylene 2,6-naphthalate (corresponding to 100% by weight of ethylene 2,6-naphthalate units). In this case there is no significant adhesion between the outer layer A and the base layer B. The film is unsuitable for industrial use (e.g. as a composite film), since the bond releases even when subjected to a low level of mechanical stress, due to the low adhesion between the outer layer A and the base layer B of the polyester film.

In a film in Example 11 of EP-A-0 878 298, the metallized outer layer A contains 60% by weight of ethylene 2,6-naphthalate units. In order to achieve the low oxygen permeation demanded, below 0.3 cm$^3$/(m$^2$·bar·d), the thickness of the outer layer A has to be raised to 2.5 µm, and this is economically disadvantageous (high capital expenditure and high material costs).

U.S. Pat. No. 5,795,528 describes a coextruded film laminate which has alternating layers of PEN and PET. Like the film of EP-A-0 878 298, this film has a tendency toward delamination between the individual layers of PEN and PET. There is no significant adhesion between these layers. A laminate of this type is therefore again unsuitable for industrial use.

It was an object of the present invention, therefore, to provide a metallized or ceramic-coated, biaxially oriented polyester film which overcomes the disadvantage of the prior art films and in particular has improved adhesion between the individual layers. It should be simple and cost-effective to produce, have very good barrier properties, and pose no problems of disposal.

SUMMARY OF THE INVENTION

The object is achieved by means of a biaxially oriented polyester film with a base layer B which comprises at least 80% by weight of thermoplastic polyester, with at least one outer layer A and with a metallic or ceramic layer arranged on the outer layer A, the characterizing features of which are regarded as being that the outer layer A is composed of a copolymer or of a mixture of polymers/copolymers, which contains from 90 to 98% by weight of ethylene 2,6-naphthalate units and up to 10% by weight of ethylene terephthalate units, and/or units derived from cycloaliphatic or aromatic diols and/or dicarboxylic acids;

the thickness of the outer layer A is more than 0.7 µm and this makes up less than 25% by weight of the entire film, and the $T_g2$ value of the polyester film is above the $T_g2$ value of the base layer but below the $T_g2$ value of the outer layer.

The metallized or ceramic-coated film of the invention has an oxygen permeation below 0.3 cm$^3$/(m$^2$·bar·d), and minimum adhesion between the individual layers of the film of greater than or equal to 0.5 N/25 mm.

DETAILED DESCRIPTION OF THE INVENTION

The structure of the film of the invention has at least two layers, and is then composed of the metallized or ceramic-coated outer layer A, and of a base layer B.

Preference is given to a polyester film in which the copolymer or the mixture of polymers of the outer layer A contain from 91% to 97% by weight of ethylene 2,6-naphthalate units and up to 9% by weight of ethylene terephthalate units and/or units derived from cycloaliphatic or aromatic diols and/or dicarboxylic acids. Among these, particular preference is in turn given to a polyester film in which the copolymer or mixture of polymers of the outer layer A contain from 92 to 96% by weight of ethylene 2,6-naphthalate units and up to 8% by weight of ethylene terephthalate units and/or units derived from cycloaliphatic or aromatic diols and/or dicarboxylic acids.

Preference is also given to a polyester film whose metallized or ceramic-coated outer layer A has a thickness of more than 0.8 µm, where this makes up less than 22% by weight of the entire film, and particular preference is given to a polyester film whose metallized or ceramic-coated outer layer A has a thickness of more than 0.9 µm, where this makes up less than 20% by weight of the entire film.

Examples of suitable aliphatic diols are diethylene glycol, triethylene glycol, aliphatic glycols of the formula HO—(CH$_2$)$_n$—OH, where n is an integer from 3 to 6 (in particular 1,3-propanediol, 1,4-butanediol, 1,5-pentanediol and 1,6-hexanediol), or branched aliphatic glycols having up to 6 carbon atoms, and cycloaliphatic diols having one or more rings and if desired containing heteroatoms. Among the cycloaliphatic diols, mention may be made of cyclohexanediols (in particular 1,4-cyclohexanediol). Examples of other suitable aromatic diols are those of the formula HO—C$_6$H$_4$—X—C$_6$H$_4$—OH where X is —CH$_2$—, —C(CH$_3$)$_2$—, —C(CF$_3$)$_2$—, —O—, —S— or —SO$_2$—. Besides these, bisphenols of the formula HO—C$_6$H$_4$—C$_6$H$_4$—OH are also very suitable.

Preferred aromatic dicarboxylic acids are benzenedicarboxylic acids, naphthalenedicarboxylic acids (for example naphthalene-1,4- or -1,6-dicarboxylic acid), biphenyl-x,x'-dicarboxylic acids (in particular biphenyl-4,4'-dicarboxylic acid), diphenylacetylene-x,x'-dicarboxylic acids (in particular diphenylacetylene-4,4'-dicarboxylic acid) or stilbene-x,x'-dicarboxylic acids. Among the cycloaliphatic dicarboxylic acids, mention may be made of cyclohexanedicarboxylic acids (in particular cyclohexane-1,4-dicarboxylic acid). Among the aliphatic dicarboxylic acids, the $C_3$–$C_{19}$-alkanedioic acids are particularly suitable, where the alkane moiety may be straight-chain or branched.

The base layer of the film is preferably composed of at least 90% by weight of the thermoplastic polyester. Polyesters suitable for this are those made from ethylene glycol and terephthalic acid (=polyethylene terephthalate, PET), from ethylene glycol and naphthalene-2,6-dicarboxylic acid (=polyethylene 2,6-naphthalate, PEN), from 1,4-bishydroxymethylcyclohexane and terephthalic acid (=poly-1,4-cyclohexanedimethylene terephthalate, PCDT), and also from ethylene glycol, naphthalene-2,6-dicarboxylic acid and biphenyl-4,4'-dicarboxylic acid (=polyethylene 2,6-naphthalate bibenzoate, PENBB). Particular preference is given to polyesters which are composed of at least 90 mol %, preferably at least 95 mol %, of ethylene glycol units and terephthalic acid units or of ethylene glycol units and naphthalene-2,6-dicarboxylic acid units. The remaining monomer units are derived from other diols and/or dicarboxylic acids. Examples of suitable diol comonomers are diethylene glycol, triethylene glycol, aliphatic glycols of the formula HO—$(CH_2)_n$—OH, where n is an integer from 3 to 6, branched aliphatic glycols having up to 6 carbon atoms, aromatic diols of the formula HO—$C_6H_4$—X—$C_6H_4$—OH where X is —$CH_2$—, —$C(CH_3)_2$—, —$C(CF_3)_2$—, —O—, —S— or —$SO_2$—, or bisphenols of the formula HO—$C_6H_4$—$C_6H_4$—OH are employed.

The dicarboxylic acid comonomer units are preferably derived from 30 benzenedicarboxylic acids, naphthalenedicarboxylic acids, biphenyl-x,x'-dicarboxylic acids (in particular biphenyl-4,4'-dicarboxylic acid), cyclohexanedicarboxylic acids (in particular cyclohexane-1,4-dicarboxylic acid), diphenylacetylene-x,x'-dicarboxylic acids (in particular diphenylacetylene-4,4'-dicarboxylic acid), stilbene-x,x'-dicarboxylic acid or $C_1$–$C_{16}$-alkanedicarboxylic acids, where the alkane moiety may be straight-chain or branched.

The polyesters may be prepared by the transesterification process. The starting materials for this are dicarboxylic esters and diols, which are reacted using the customary transesterification catalysts, such as salts of zinc, of calcium, of lithium and of manganese. The intermediates are then polycondensed in the presence of widely used polycondensation catalysts, such as antimony trioxide or titanium salts. The preparation may be carried out just as successfully by the direct esterification process in the presence of polycondensation catalysts, starting directly from the dicarboxylic acids and the diols.

The copolymers for the outer layer A may be prepared in three different ways:

a) In copolycondensation, terephthalic acid and naphthalene-2,6-dicarboxylic acid are placed in a reactor together with ethylene glycol, and polycondensed to give a polyester, using the customary catalysts and stabilizers. The terephthalate and naphthalate units are then randomly distributed in the polyester.

b) Polyethylene terephthalate (PET) and polyethylene 2,6-naphthalate (PEN), in the desired ratio, are melted together and mixed, either in a reactor or preferably in a melt kneader (twin-screw kneader) or in an extruder. Immediately after the melting, transesterification reactions between the polyesters begin. Initially, block copolymers are obtained, but as reaction time increases—depending on the temperature and mixing action of the agitator—the blocks become smaller, and long reaction times give a random copolymer. However, it is not necessary and also not always advantageous to wait until a random distribution has been achieved, since the desired properties are also obtained with a block copolymer. The resultant copolymer is then extruded from a die and granulated.

c) Polyethylene terephthalate (PET) and polyethylene 2,6-naphthalate (PEN) are mixed as granules in the desired ratio, and the mixture is fed to the extruder for the outer layer A. Here, the transesterification to give the copolymer takes place directly during the production of the film. This process has the advantage of being very cost-effective, and generally gives block copolymers, the block length being dependent on the extrusion temperature, the mixing action of the extruder and the residence time in the melt.

In a preferred embodiment of the invention, from 0.1 to 20% by weight of the polymers of the base layer B are identical with those of the outer layer A. These are either directly admixed with the base layer B during extrusion or are in any case present in the film due to addition of regrind. The proportion of these copolyesters in the base layer is selected in such a way that the base layer has crystalline character.

In another embodiment, the film encompasses, on the side facing away from the outer layer A, another outer layer of polyethylene terephthalate, and this layer may, like the outer layer to be metallized, comprise pigments.

The film of the invention has a high oxygen barrier and, surprisingly, the desired good adhesion between its individual layers.

If the polymers/copolymers used for the outer layer A contain less than 90% of ethylene 2,6-naphthalate units and more than 10% by weight of ethylene terephthalate units, the thickness of the outer layer A being less than 0.7 μm, although the film then has less permeability to oxygen than a standard polyester film (composed of 100% by weight of polyethylene terephthalate), its permeability is too high for the purposes of the present invention.

If the polymers/copolymers used for the metallized or ceramic-coated outer layer A contain more than 98% by weight of ethylene 2,6-naphthalate units (for example are pure polyethylene 2,6-naphthalate), the adhesion between the outer layer A and the base layer B becomes inadequate. When subjected to mechanical stress the film tends toward delamination, which is undesirable and makes the film unusable.

A difference from the prior art is that in the film of the invention moreover the glass transition temperature $T_g$ of the copolymer or of the copolymers of the outer layer A is higher than the glass transition temperature $T_g$ of the polymers for the base layer B. The glass transition temperature $T_g$ of the copolymers used for the outer layer A is preferably in the range from 90 to 120° C. In DSC (differential scanning calorimetry) determination of the glass transition temperatures, the transitions of the layers cannot be differentiated.

Glass transitions which are determined on biaxially oriented, heat-set films in the first heating procedure (termed $T_g1$ below) are, due to crystallinity and also to molecular stresses in the amorphous fraction of the specimens, relatively small in size, distributed over a wide temperature range, and shifted to higher temperatures. Because of orientation effects in particular, they are not suitable for characterizing a polymer. The resolution of DSC analyzers is often insufficient to detect the glass transitions in the first heating procedure ($T_g1$) of the individual layers of the film of the invention, the transitions being "blurred" and small, due to orientation and crystallinity.

If the specimens are melted and then rapidly cooled again to below their glass transition temperature $T_g$ (quenched), the orientation effects are eliminated. On renewed heating, glass transitions (designated $T_g2$ here) are then measured which have a greater intensity and are characteristic of the respective polymers. However, even here it is not possible to differentiate the glass transitions of the individual layers, since the layers mix on melting and the polyesters present therein enter into transesterification reactions with one another. It is fully sufficient, however, to compare the $T_g2$ of the entire coextruded films with the $T_g2$ of the polymer used for the base layer B. In known films the $T_g2$ value of the base layer is higher than that of the coextruded film, whereas the $T_g2$ value of the outer layer is lower than that of the base layer and also than that of the coextruded film. Exactly the opposite relationships apply for the film of the invention. Here, the $T_g2$ value of the coextruded film is higher than that of the base layer B but below the $T_g2$ value of the polymer for the outer layer A.

The high oxygen barrier demanded is not achieved if the metallic layer or the ceramic layer is applied to that side of the base layer facing away from the outer layer A (and not to the outer layer A itself). This is true even if in other respects the makeup of base layer and of outer layer A corresponds to the film of the invention.

The base layer B and the outer layer(s) may also comprise customary additives, such as stabilizers and antiblocking agents. These are expediently added to the polymer or to the polymer mixture even before melting takes place. Examples of stabilizers are phosphorus compounds, such as phosphoric acid and phosphoric esters. Typical antiblocking agents (also termed pigments in this context) are inorganic and/or organic particles, for example calcium carbonate, amorphous silica, talc, magnesium carbonate, barium carbonate, calcium sulfate, barium sulfate, lithium phosphate, calcium phosphate, magnesium phosphate, aluminum oxide, LiF, the calcium, barium, zinc and manganese salts of the dicarboxylic acids used, carbon black, titanium dioxide, kaolin, crosslinked polystyrene particles and crosslinked acrylate particles.

The additives selected may also be mixtures of two or more different antiblocking agents or mixtures of antiblocking agents of the same makeup but of different particle size. The particles may be added to the individual layers in the customary concentrations, e.g. as glycolic dispersion during polycondensation or via masterbatches during extrusion. Pigment concentrations of from 0.0001 to 5% by weight have proven advantageous. A detailed description of the antiblocking agents is found, for example, in EP-A-0 602 964.

The film may be coated and/or corona- or flame-pretreated to establish other desired properties. Typical coatings are layers which promote adhesion, are antistatic, improve slip, or have release action. These additional layers may be applied to the film by in-line coating using aqueous dispersions, before transverse orientation.

The polyester film of the invention preferably also comprises a second outer layer C. The structure, thickness, and makeup of the second outer layer C may be selected without reference to the outer layer A already present, and the second outer layer C may also comprise the abovementioned polymers or polymer mixtures, but these do not have to be identical with the chemical makeup of outer layer A. The second outer layer C may also comprise other commonly used outer layer polymers.

Between the base layer B and the outer layer A, there may also be an intermediate layer Z. The thickness of the intermediate layer is generally above 0.1 μm and is preferably in the range from 0.2 to 20 μm, particularly from 0.3 to 10 μm.

The thickness of the outer layer C is generally above 0.1 μm, preferably in the range from 0.2 to 5 μm, particularly from 0.2 to 4 μm, and the thicknesses of the outer layers may be identical or different.

The total thickness of the polyester film of the invention may vary within wide limts and depends on the application envisaged. It is from 6 to 100 μm, preferably from 8 to 50 μm, and particularly preferably from 10 to 30 μm, the proportion of the total thickness made up by the base layer preferably being from about 40 to 95%.

The metallic layer is preferably composed of aluminum. However, other materials which can be applied in the form of a thin coherent layer are also suitable, particularly silicon, for example, which unlike aluminum gives a transparent barrier layer. The ceramic layer is preferably composed of oxides of elements of the 2nd, 3rd or 4th main group of the Periodic Table, in particular of oxides of magnesium, of aluminum, or of silicon. The metallic or ceramic materials used are generally those which can be applied at subatmospheric pressure or in vacuo. The thickness of the layer applied is generally from 10 to 100 nm.

The present invention also provides a process for producing this film. It encompasses a) producing a film having two or more layers from a base layer B and outer layer(s) A and, where appropriate, C, by coextrusion;

b) biaxially stretching the film, and c) heat-setting the stretched film.

To produce the outer layer A, it is expedient to feed granules of polyethylene terephthalate and polyethylene 2,6-naphthalate directly to the extruder in the desired mixing ratio. At about 300° C., the two materials can be melted and can be extruded. Under these conditions, transesterification reactions can occur in the extruder and during these copolymers are formed from the respective homopolymers.

The polymers for the base layer B are expediently fed in via another extruder. Any foreign bodies or contamination which may be present can be filtered off from the polymer melt before extrusion. The melts are then extruded through a coextrusion die to give flat melt films and are layered one upon the other. The composite film is then drawn off and solidified with the aid of a chill roll and other rolls if desired.

The biaxial stretching is generally carried out sequentially, stretching first longitudinally (i.e. in the machine direction) and then transversely (i.e. perpendicularly to the machine direction). This leads to orientation of the molecular chains within the polyester. The longitudinal stretching can be carried out with the aid of two rollers rotating at different rates corresponding to the desired stretching ratio. For the transverse stretching, use is generally made of an appropriate tenter frame.

The temperature at which the orientation procedure is carried out can vary over a relatively wide range and depends on the properties desired in the film. In general, the longitudinal stretching is carried out at from 80 to 130° C., and the transverse stretching at from 90 to 150° C. The longitudinal stretching ratio is generally in the range from 2.5:1 to 6:1, preferably from 3:1 to 5.5:1. The transverse stretching ratio is generally in the range from 3.0:1 to 5.0:1, preferably from 3.5:1 to 4.5:1.

During the subsequent heat-setting, the film is held for from 0.1 to 10 s at a temperature of from 150 to 250° C. The film is then wound up in a conventional manner.

Prior to the transverse stretching, one or both surfaces of the film may be in-line coated by known processes. The in-line coating may, for example, serve to improve adhesion of the metallic layer to the outer layer A or of any printing ink which might be applied to the film, or else to improve antistatic performance or processing performance.

One or both side(s) of the biaxially oriented and heat-set polyester film may be corona- or flame-treated prior to application of the metallic or ceramic layer. The intensity of treatment selected is such that the resultant surface tension of the film is generally above 45 mN/m.

A great advantage of this process is that it is possible to feed the extruder with granules, which do not block the machine.

A further advantage is that the production costs of the film of the invention are only insignificantly greater than those of a film made from standard polyester raw materials. The other properties of the film of the invention which are relevant to its processing and its use remain essentially unchanged or have even been improved. It has also been ensured that cut material arising directly in the plant during film production can be used again in the form of regrind for film production in amounts of up to 60% by weight, preferably from 10 to 50% by weight, based in each case on the total weight of the film, without any significant resultant adverse effect on the physical properties of the film thus produced with regrind.

The film has excellent suitability for packaging food or other consumable items. The film of the invention has excellent barrier properties, in particular with respect to oxygen. It has been assured that the individual layers of the laminate remain adhering to one another when the film is processed, e.g. to give film laminates, and do not delaminate.

It is also possible to improve the gloss and the haze of the film, compared with prior art films. It has been ensured that regrind can be reintroduced to the extrusion process during production of the film in amounts of up to 60% by weight, based on the total weight of the film, without any significant resultant adverse effect on the physical properties of the film.

The excellent handling properties of the film and its very good processing properties make it particularly suitable for processing on high-speed machinery.

The metallic layer or the ceramic layer is usefully applied in well known industrial systems. Metallic layers made from aluminum are usually produced by metalizing, while ceramic layers may also be produced using electron beam processes or by sputtering. The process parameters for the system during application of the metallic or ceramic layer to the films correspond to standard conditions. The metalization of the films is preferably carried out so as to give an optical density in the usual range from about 2.2 to 2.8 for the metalized films. The application of the ceramic layer to the film is carried out so as to give an oxide layer thickness preferably in the range from 30 to 100 nm. The web speed of the film to be coated is from 5 to 10 m/s for all settings of variables. A laboratory metalization system was not used for metalizing, since experience has shown that the barrier values are then generally significantly better and cannot be used for comparative purposes.

The table below (Table 1) gives the most important film properties of the invention again at a glance for quick reference.

TABLE 1

|  | Range according to the invention | Preferred | Particularly preferred | Unit | Test method |
|---|---|---|---|---|---|
| Outer layer A |  |  |  |  |  |
| Ethylene 2,6-naphthalate units | 90 to 98 | 91 to 97 | 92 to 96 | % by weight |  |
| Ethylene terephthalate units | <10 | <9 | <8 | % by weight |  |
| Thickness | 0.7 μm up to 25% of total thickness | 0.8 μm up to 22% of total thickness | 0.9 μm up to 20% of total thickness | μm/% by weight |  |
| Film properties |  |  |  |  |  |
| Oxygen permeation | <0.3 | <0.25 | <0.20 | cm$^3$/(m$^2$ · bar · d) | DIN 53 380, Part 3 |
| Adhesion between the layers | >0.5 | >0.7 | >1.0 | N/25 mm | internal |

Test Methods

The following methods were utilized to characterize the raw materials and the films:

Oxygen Permeability

The oxygen barrier test took place using a Mocon Modern Controls (USA) OX-TRAN 2/20, as in DIN 53 380, Part 3.

Measurement of Optical Density

Optical density was measured using the TD-904 densitometer from Macbeth (Division of Kollmorgen Instruments Corp.). The optical density is defined as OD=–lg $1/1_0$, where l is the intensity of the incident light, $l_0$ is the intensity of the emitted light, and $1/1_0$ is the transmittance.

SV (Standard Viscosity)

The standard viscosity SV (DCA) is measured by analogy with DIN 53726, at 25° C. in dichloroacetic acid. The intrinsic viscosity (IV) is calculated from the standard viscosity as follows $$IV=[\eta]=6.907 \cdot 10^{-4} SV\ (DCA)+0.063096\ [dl/g].$$

Coefficient of Friction

The coefficient of friction was determined to DIN 53 375. The coefficient of sliding friction was measured 14 days after production.

Surface Tension

Surface tension was determined using what is known as the ink method (DIN 53 364).

Haze

The haze of the film was measured to ASTM-D1003-52. The Hölz haze measurement was determined by analogy with ASTM-D1003-52, but, in order to utilize the ideal measurement range, measurements were taken on four pieces of film laid one on top of the other, and a 1° slit diaphragm was used instead of a 40° pinhole.

Gloss

Gloss was determined to DIN 67 530. The reflectance was measured, this being a characteristic optical value for a film surface. Based on the standards ASTM-D523-78 and ISO 2813, the angle of incidence was set at 20° or 60°. A beam of light at the set angle of incidence hits the flat test surface and is reflected and/or scattered thereby. A proportional electrical variable is displayed representing light rays hitting the photoelectric detector. The value measured is dimensionless and must be stated together with the angle of incidence.

Glass Transition Temperatures

The glass transition temperatures $T_g1$ and $T_g2$ were determined with the aid of DSC (differential scanning calorimetry) on film specimens. A DuPont DSC 1090 was used. The heating rate was 20 K/min, and the specimen weight was about 12 mg. The glass transition $T_g1$ was determined in the first heating procedure. Many of the specimens showed an enthalpy relaxation (a peak) at the beginning of the step-like glass transition. The temperature taken as $T_g1$ was that at which the step-like change in heat capacity—ignoring the enthalpy relaxation peak—achieved half of its height in the first heating procedure. In all cases, there was only a single glass transition stage in the thermogram in the first heating procedure. It is possible that the enthalpy relaxation peaks obscured the fine structure of the transition, or that the resolution of the device was not adequate to separate the small, "blurred" transitions of oriented, crystalline specimens. In order to eliminate their heat history the specimens were held at 300° C. for 5 minutes after the heating procedure, and then quenched with liquid nitrogen. The temperature for the glass transition $T_g2$ was taken as the temperature at which the transition reached half of its height in the thermogram for the second heating procedure.

Adhesion Between the Layers

Prior to adhesive bonding, the specimen of film (300 mm long×180 mm wide) of the present invention is placed on a smooth piece of card (200 mm long×180 mm wide; about 400 g/m², bleached, outer laps coated). The overlapping margins of the film are folded back onto the reverse side and secured with adhesive tape.

For adhesive bonding of the film according to the present invention, use is made of a standard polyester film of 12 µm thickness (e.g. Melinex 800), and a doctor device and doctor bar No. 3 from Erichsen, applying about 1.5 ml of adhesive (Novacote NC 275+CA 12; mixing ratio: 4/1+7 parts of ethyl acetate) to the outer layer A of the film of the present invention. After aerating to remove the solvent, the standard polyester film is laminated to outer layer A of the film of the present invention using a metal roller (width 200 mm, diameter 90 mm, weight 10 kg, to DIN EN 20 535). The lamination parameters are:

| | |
|---|---|
| Amount of adhesive: | 5 +/− 1 g/m² |
| Aeration after application of adhesive: | 4 min +/− 15 s |
| Doctor thickness (Erichsen): | 3 |
| Doctor speed level: | about 133 mm/s |
| Bond curing time: | 2 h at 70° C. in a circulating air drying cabinet |

A 25±1 mm strip cutter is used to take specimens about 100 mm in length. About 50 mm of composite is needed here, and 50 mm of unbonded separate laps for securing/clamping the test specimen. The test specimens are secured to a sheet metal support by means of double-sided adhesive tape, by way of the entire surface of the reverse side of the film of the present invention (base layer B or outer layer C). The sheet with the composite adhesively bonded thereto is clamped into the lower clamping jaw of the tensile test machine. The clamp separation is 100 mm. The unlaminated end of the standard polyester film is clamped into the upper clamping jaw of the tensile test machine (e.g. Instron, Zwick) so that the resultant peel angle is 180°. The average peel force in N/25 mm is given, rounded to one decimal place.

| | |
|---|---|
| Specimen width: | 25 mm |
| Pretensioning force: | 0.1 N |
| Test length: | 25 mm |
| Separation rate until pretensioning force applied: | 25 mm/min |
| Start position: | 5 mm |
| Test displacement: | 40 mm |
| Sensitivity: | 0.01 N |
| Separation rate: | 100 mm/min |

The peel force test result is equivalent to the minimum adhesion between the layers, since the adhesion between the adhesive and the standard film is markedly greater. A UV lamp, for example, can be used to demonstrate the release of the outer layer A from the base layer B of the film of the present invention. The UV light has a blueish appearance if copolymer of PEN and PET is present on the adhesive and this layer is irradiated using a UV lamp.

EXAMPLE

The following examples illustrate the invention. Information on each of the products used (trademark and manufacturer) is given only once, and this is then applicable to the examples which follow.

Example 1

Chips of polyethylene terephthalate and polyethylene 2,6-naphthalate in a mixing ratio of 3:97 were dried at a temperature of 160° C. to residual moisture below 100 ppm, and fed directly to the extruder for the outer layer A, where the two materials were extruded at a temperature of about 300° C. The melt was filtered and extruded through a coextrusion die to give a flat film and, as outer layer A, superposed on the base layer B. The coextruded film was discharged by way of the die lip and solidified on a chill roll. The residence time of the two polymers in the extrusion process was about 5 min. Under the conditions given, a copolymer was produced in the extrusion process.

Chips of polyethylene terephthalate were dried at a temperature of 160° C. to residual moisture below 100 ppm and fed to the extruder for the base layer B. In addition, chips of polyethylene terephthalate and antiblocking agents were likewise dried at 160° C. to residual moisture of 100 ppm and fed to the extruder for the outer layer C. The conditions in the extruder for the outer layer C were the same as those for coextruder A.

Coextrusion followed by stepwise longitudinal and transverse streching was used to produce a transparent three-layer ABC film with a total thickness of 12 μm. The thickness of the outer layer A was 1.1 μm and that of the outer layer C was 1.0 μm. One side of the film, outer layer A, was then metalized in vacuo with aluminum in an industrial metalizer. The coating speed was 5 m/s.

Outer layer A:
97% by weight of polyethylene 2,6-naphthalate (®Polyclear P 100 prepolymer from KOSA, Offenbach) with an SV of 600, and
3% by weight of polyethylene terephthalate with SV of 800.

Base layer B:
100% by weight of polyethylene terephthalate (4020 from KOSA, Offenbach) with SV of 800.

Outer layer C:
80% by weight of polyethylene terephthalate with SV of 800, and
20% by weight of masterbatch made from 99.0% by weight of polyethylene terephthalate and 1.0% by weight of silica particles, 50% of which had an average particle size of 2.5 μm, and 50% of which had an average particle size of 0.4 μm.

The individual steps of the process were:

| | | | |
|---|---|---|---|
| Extrusion | Temperatures: | Outer layer A: | 300° C. |
| | | Base layer B: | 300° C. |
| | | Outer layer C: | 300° C. |
| Take-off roll temperature | | | 30° C. |
| Longitudinal stretching temperature: | | | 122° C. |
| Longitudinal stretching ratio: | | | 4.5:1 |
| Transverse stretching temperature: | | | 125° C. |
| Transverse stretching ratio: | | | 4.0:1 |
| Setting temperature: | | | 230° C. |

The film had the oxygen barrier required and the adhesion required.

Example 2

Coextrusion was used as in Example 1 to produce a three-layer ABC film with a total thickness of 12 μm. The thickness of the outer layer A was 1.3 μm and the thickness of the outer layer C was 1.0 μm. The outer layer A of the film was metalized with aluminum in vacuo in a conventional industrial metalizer. The coating speed was 5 m/s.

Outer layer A:
95% by weight of polyethylene 2,6-naphthalate (®Polyclear P 100 prepolymer from KOSA, Offenbach) with an SV of 600, and
5% by weight of polyethylene terephthalate with SV of 800.

Base layer B:
100% by weight of polyethylene terephthalate (4020 from KOSA, Offenbach) with SV of 800.

Outer layer C:
80% by weight of polyethylene terephthalate with an SV of 800, and
20% by weight of masterbatch made from 99.0% by weight of polyethylene terephthalate and 1.0% by weight of silica particles, 50% of which had an average particle size of 2.5 μm, and 50% of which had an average particle size of 0.4 μm.

The process conditions for all of the layers were as in Example 1.

Comparative Example 1c

A film was produced by analogy with Example 8 of EP-A-0 878 298. The film metalized on the outer layer A had the oxygen barrier required, but the adhesion between layers A and B was extremely low.

Comparative Example 2c

A film was produced by analogy with Example 1 of U.S. Pat. No. 5,795,528, except that unlike in the example from U.S. Pat. No. 5,795,528 there were only 2 layers selected from PEN and PET. The film metalized on the PEN surface had the oxygen barrier required, but the adhesion between layers A and B was extremely low. Table 3 gives the properties of the films produced in Examples 1 and 2 and in the Comparative Examples 1 c and 2c.

TABLE 2

| Example No. | Ethylene 2,6-naphthalate units in outer layer A (in % by weight) | Ethylene terephthalate units in outer layer A (in % by weight) |
|---|---|---|
| 1 | 97 | 3 |
| 2 | 95 | 5 |
| 1c | 100 | 0 |
| 2c | 100 | 0 |

TABLE 3

| Example No. | Film thickness (μm) | Layer thicknesses A/B/C (μm) | Film structure | Oxygen permeation (cm³/m² bar d) | Optical density of metal layer | Adhesion between layers N/25 mm | Gloss (20° measurement angle) Side A | Gloss (20° measurement angle) Side C | Haze[1] |
|---|---|---|---|---|---|---|---|---|---|
| 1 | 12 | 1.1/9.9/1.0 | ABC | 0.08 | 2.60 | 0.6 | 205 | 175 | 1.8 |
| 2 | 12 | 1.3/9.7/1.0 | ABC | 0.068 | 2.60 | 1.4 | 199 | 180 | 1.6 |
| 1c | 12 | 3.0/7.5/1.5 | ABC | 0.07 | 2.60 | 0.1 | 203 | 175 | 1.8 |
| 2c | 12 | 6.0/6.0 | AB | 0.08 | 2.60 | 0.1 | 200 | 195 | 2.0 |

[1]measured on the non-metalized film

What is claimed is:

1. A biaxially oriented polyester film with a base layer B, which comprises at least 80% by weight of thermoplastic polyester, and with at least one outer layer A and with a metallic or ceramic layer arranged on the outer layer A and said film having an adhesion between the individual layers of greater than or equal to 0.5 N/25 mm, wherein the outer layer A is composed of a copolymer or of a mixture of polymers/copolymers, which contains from 90 to 98% by weight of ethylene 2,6-naphthalate units and up to 10% by weight of ethylene terephthalate units, and/or units derived front cycloaliphatic or aromatic diols and/or dicarboxylic acids;

the thickness of the outer layer A is more than 0.7 μm and this makes up less than 25% by weight relative to the entire film, and the $T_g2$ value of the polyester film is above the $T_g2$ value of the base layer but below the $T_g2$ value of the outer layer.

2. The film as claimed in claim 1, wherein the copolymer or the mixture of polymers of outer layer A contains from 91 to 97% by weight of ethylene 2,6-naphtbalate units.

3. The film as claimed in claim 1, wherein the thickness of the outer layer A is more than 0.8 μm, this making up less tan 22% by weight relative to the entire film.

4. The film as claimed in claim 1, wherein the oxygen permeation of the film is below 0.3 $cm^3/(m^2 \times bar \times d)$.

5. The film as claimed in claim 1, which additionally comprises an intermediate layer Z which has a thickness above 0.1 μm.

6. The film as claimed in claim 1, which has three layers and is composed of the base layer B, the outer layer A, and the outer layer C.

7. The film as claimed in claim 1, which has four layers and comprises the outer layer C, arranged thereupon the base layer B, arranged thereupon the intermediate layer A and arranged thereupon the outer layer A.

8. The film as claimed in any one of claims 1 to 7, wherein at least one of the outer layers has been pigmented.

9. The film as claimed in claim 1, wherein at least one side of the film has been corona-treated.

10. The film as claimed in claim 1, wherein at least one side of the film has been in-line coated.

11. A process for producing the film as claimed in claim 1, encompassing the steps producing a film from base and outer layer(s) by coextrusion, biaxially stretching the film, heat-setting the stretched film, and applying the metal layer or the ceramic layer to the heat-set film, which comprises carrying out the biaxial stretching by a longitudinal stretching of the film at a temperature in the range from 80 to 130° C. and by a transverse stretching in die range from 90 to 150° C. and using a longitudinal stretching ratio in the range from 2.5:1 to 6:1, and using a transverse stretching ratio in the range from 3.0:1 to 5.0:1.

12. The process as claimed in claim 11, wherein, for hear-setting, the stretched film is held for a period of from about 0.1 to 10 s at a temperature of from 150 to 250° C.

13. The process as claimed in claim 11, wherein cut material arising during film production is reused as regrind in the film production in amounts of up to 60% by weight based in each ease on the total weight of the film.

* * * * *